(12) United States Patent
Fiello

(10) Patent No.: US 7,794,525 B2
(45) Date of Patent: Sep. 14, 2010

(54) HOOD AIR SCOOP

(75) Inventor: Jonathan Richard Fiello, Yucaipa, CA (US)

(73) Assignee: K&N Engineering, Inc., Riverside, CA (US)

( * ) Notice: Subject to any disclaimer, the term of this patent is extended or adjusted under 35 U.S.C. 154(b) by 465 days.

(21) Appl. No.: 11/841,462

(22) Filed: Aug. 20, 2007

(65) Prior Publication Data

US 2009/0049987 A1 Feb. 26, 2009

(51) Int. Cl.
*B01D 46/00* (2006.01)

(52) U.S. Cl. .......................... 95/273; 55/385.3; 55/418; 55/523; 55/DIG. 28; 123/198 E

(58) Field of Classification Search ................. 55/385.3, 55/418, DIG. 28, 523; 95/273; 123/198 E
See application file for complete search history.

(56) References Cited

U.S. PATENT DOCUMENTS

| | | | | |
|---|---|---|---|---|
| 3,458,977 | A * | 8/1969 | Humbert, Jr. et al. | ......... 55/490 |
| 3,870,495 | A * | 3/1975 | Dixson et al. | .................. 55/489 |
| 4,162,660 | A * | 7/1979 | Albertson et al. | ........... 116/268 |
| 4,376,637 | A * | 3/1983 | Yang | ............................. 95/74 |
| 4,704,143 | A * | 11/1987 | Percy | .......................... 96/421 |
| 5,147,430 | A * | 9/1992 | Kidd | ........................ 55/385.3 |
| 5,555,852 | A * | 9/1996 | Reymanandt, IV | .......... 123/1 A |
| 5,564,513 | A * | 10/1996 | Wible et al. | ................. 180/68.3 |
| 5,586,540 | A * | 12/1996 | Marzec et al. | ........... 123/559.1 |
| 5,634,952 | A * | 6/1997 | Kasai et al. | .................... 55/302 |
| 6,463,901 | B1 * | 10/2002 | Cuddihee, Sr. et al. | . 123/184.21 |
| 7,563,309 | B2 * | 7/2009 | Simpson, Jr. | ................. 95/278 |
| 2003/0029145 | A1 * | 2/2003 | Sudoh | .......................... 55/418 |
| 2006/0086073 | A1 * | 4/2006 | Fiello et al. | ................. 55/385.3 |
| 2008/0202080 | A1 * | 8/2008 | Barataud-Dien et al. | ... 55/385.3 |
| 2008/0236119 | A1 * | 10/2008 | Boland et al. | .................. 55/482 |
| 2009/0041635 | A1 * | 2/2009 | Berkey et al. | ................ 422/177 |
| 2009/0291033 | A1 * | 11/2009 | Giassi et al. | ................. 422/180 |

FOREIGN PATENT DOCUMENTS

| | | | | |
|---|---|---|---|---|
| JP | | 01172022 A | * | 7/1989 |
| JP | | 01262313 A | * | 10/1989 |

* cited by examiner

*Primary Examiner*—Jason M Greene
*Assistant Examiner*—Dung Bui
(74) *Attorney, Agent, or Firm*—Hani Z. Sayed; Rutan & Tucker, LLP

(57) ABSTRACT

An apparatus and a system is provided that may be utilized to provide stability to air flow through a hood scoop. The present invention may also be utilized to straighten and smooth out air flow through a hood scoop and accompanying air filter media. The present invention utilizes an air filtration media which may be inserted into at least a portion of a vehicle hood scoop and may filter out particulate and may also slow air flow down temporarily in order to straighten and/or smooth turbulent air flow through the air filtration media. Additionally, the present invention may provide an apparatus that may facilitate more uniform pressure inside the hood scoop of the vehicle.

20 Claims, 2 Drawing Sheets

HOOD AIR SCOOP

FIELD OF THE INVENTION

The present invention relates generally to the field of vehicle parts. More specifically, the present invention relates to apparatus and system for filtration of air through a vehicle hood scoop and straightening of the air exiting the filter and into the engine of a vehicle.

BACKGROUND OF THE INVENTION

On any given vehicle, there are thousands of functioning and necessary parts to make the vehicle move. These essential parts are usually interlinked with other parts as part of an overall system to make the vehicle run efficiently.

For many car enthusiasts, modifying a factory vehicle with upgraded aftermarket parts is rewarding and satisfying in a multiplicity of different ways. Many individuals decide to modify their vehicles for aesthetic purposes. However, many individuals modify or alter their vehicles to elicit better performance from their vehicle or to upgrade from more restrictive parts that come with their vehicle from the factory to less restrictive parts with better usability and/or performance.

There are some very common aftermarket modifications that most vehicle enthusiasts such as car owners, motorcycle owners, boat, and other gasoline/diesel powered vehicle owners choose to employ. A few of these common aftermarket modifications are replacement of a vehicle exhaust system, and replacement of headers (which are tubes that run from the engine and direct unwanted heat and exhaust away from the engine). Additionally, many individuals will recalibrate a vehicle's computer which regulates engine speed and other functions to elicit higher performance and tolerances. However, the most common type of vehicle modification is the replacement of the stock air filter with an aftermarket type air filter.

The two main types of air filters that are used in vehicles are the combustion air filter, and the cabin air filter. The cabin air filter is a pleated paper filter that is placed in the outside-air intake for the vehicle'as passenger compartment. Some of these filters are rectangular and similar in shape to the combustion air filter. Others are uniquely shaped to fit the available space of a particular vehicle's outside-air intake. This type of filter is relatively new to the car industry and often gets clogged and dirty. Newer cabin air filters may reduce allergens and may utilize additional compositions to reduce particulates, odors and the like.

Combustion air filters are used in vehicles to prevent abrasive particulate matter from entering the engine. If particulate matter enters the engine, it could cause mechanical problems or contamination of vital fluids needed for proper engine management, including contamination of engine oil.

Most modern, fuel injected vehicles use some sort of pleated paper filter element in the form of a flat panel. This filter is usually placed inside a plastic box connected to the throttle body with a large hose. The filter may stop particulate matter and other contaminates from entering the engine and causing damage or degradation of the engine.

Most air filters are constructed from similar materials. Traditional prior art air filters are constructed from a pleated paper filter because they are efficient, easy to use and cost-effective. Other air filters are constructed of different materials such as cotton, foam and the like. Aftermarket filters are typically constructed of one and/or a combination of these materials and may allow for more air flow from the outside of the vehicle to the engine, which may increase engine performance while still reducing contaminant intrusion into the engine.

A very large aftermarket presence has arisen from the replacement of the stock factory air filter with a newer, more efficient filter that may allow for increased air flow through the filter and subsequently into the engine. A pioneer in the replacement air filter is the company K&N® Engineering, Inc. K&N® developed a new air filter which is composed of a cotton gauze material which is placed between aluminum wire mesh. The new air filter was the first of its kind that was not constructed to be replaced after a period of time. The K&N® filter was made to withstand repeated washing of the filter, while still operating effectively as a tool to filter particulates. In order for the K&N® filter to operate effectively in filtering particulates, dust and a plurality of other particles, the filter is treated with a specially formulated oil. When the filter is accessed, and subsequently washed, the filter needs to be oiled to attract and retain particulates once it is re-inserted into the vehicle. This specially formulated oil is applied to the filter after the filter has been cleaned and prior to insertion into the vehicle.

However, one problem that exists, is that air entering the air filtration media tends to be very turbulent and is not properly directed into the engine after exiting the air filtration media. Additionally, another problem that exists, is that most air filtration media are contained inside a vehicle and the air is directed to the air filter. By the time the air flow reaches the air filtration media, air flow and pressure are greatly diminished causing low air flow into the vehicle.

A need therefore exists for an apparatus and system that may be placed in the direct path of air flow such that higher air flow may be directed into the vehicle. Additionally, a need therefore exists for an apparatus and system for placement of an air filtration media into the front portion of a vehicle hood scoop to increase air flow and at the same time, filter out particulate from entering the vehicle.

Moreover, a need exists for an apparatus and system for utilizing an air filtration media to smooth and straighten air flow into the engine of a vehicle to create uniform air pressure.

SUMMARY OF THE INVENTION

The present invention relates to an apparatus and a system that may be utilized to provide stability to air flow through a hood scoop. The present invention may also be utilized to straighten and smooth out air flow through a hood scoop and accompanying air filter media. The present invention utilizes an air filtration media which may be inserted into at least a portion of a vehicle hood scoop and may slow air flow down temporarily in order to straighten and/or smooth turbulent air flow through the air filtration media. Additionally, the present invention may provide an apparatus that may facilitate more uniform pressure inside the hood scoop of the vehicle.

To this end, in an exemplary embodiment of the present invention, an apparatus for filtering and straightening air flow through a filtration media is provided. The apparatus has a hood scoop mounted on a vehicle and a filtration media capable of filtering particulate from entering air wherein the filtration media is mounted into the hood scoop of the vehicle.

In an exemplary embodiment, the apparatus has a filtration media whereby the filtration media is a vehicle air filter.

In an exemplary embodiment, the apparatus has an air filtration media wherein the air filtration media has a plurality of honeycomb openings thereon.

In an exemplary embodiment, the apparatus has a hood scoop wherein the hood scoop of the vehicle has an opening thereon whereby the opening is utilized to accommodate intake of air into the engine of the vehicle.

In an exemplary embodiment, the apparatus has a hood scoop wherein the hood scoop of the vehicle has an opening thereon whereby the opening is utilized to accommodate intake of air into the engine of the vehicle and further wherein the filtration media is located in the opening of the hood scoop.

In an exemplary embodiment, the apparatus has a filtration media that is located just inside the opening of the hood scoop.

In an exemplary embodiment, the apparatus has a filtration media that is mounted in a vertical plane to the outside opening of the hood scoop whereby air entering the hood scoop would by default encounter the filtration media before it could further enter the engine of a vehicle and further wherein the filtration media is in direct contact with air flow outside a vehicle.

To this end, in an exemplary embodiment of the present invention, a system for filtration and straightening of air flow into a vehicle engine is provided. The system has a hood scoop mounted onto a vehicle, and an air filtration media having a front portion and a rear portion whereby the air filtration media is adapted to be releasably attached to the hood scoop mounted onto a vehicle.

In an exemplary embodiment, the system has an air filtration media which is capable of smoothing and straightening incoming air.

In an exemplary embodiment, the system has air flow entering the air filtration media which may be turbulent, and further wherein the air filtration media is capable of providing uniform air pressure exiting from the rear portion of the media.

In an exemplary embodiment, the system has an air filtration media that may have at least one side wherein the at least one side is adaptable for fitment against the inside edge of the hood scoop.

In an exemplary embodiment, the system has an air filtration media that may utilize a plurality of honeycomb openings thereon to stabilize incoming turbulent air directed at the front portion of the air filtration media thereby creating laminar air flow within the hood scoop area.

In an exemplary embodiment, the system has an air filtration media that is substantially fully exposed to air flow entirely outside of the vehicle.

In an exemplary embodiment, the system has an air filtration media that covers the entire width of an opening in the hood scoop mounted on a vehicle.

In an exemplary embodiment, the system has a hood scoop wherein the hood scoop is attached to the front portion of the vehicle in a position above the hood of the vehicle.

To this end, in an exemplary embodiment of the present invention, a method for utilizing a filtration and laminar air flow system, the method comprising the steps of: providing a vehicle hood scoop mounted to a portion of the vehicle whereby the hood scoop has an opening thereon to accommodate air flow from outside the vehicle and to direct said air flow to the engine of the vehicle; and providing an air filtration media whereby the air filtration media is utilized to filter particulate and to stabilize air pressure entering the vehicle.

In an exemplary embodiment, the method further comprises the step of: utilizing a plurality of honeycomb shaped openings on the air filtration media to allow for laminar air flow of incoming air, thereby producing laminar air flow whereby the shape of the openings allows for smoothing and straightening of incoming air into the back portion of the hood scoop and further into the engine of the vehicle.

In an exemplary embodiment, the method further comprises the step of: providing an air filtration media having a front portion and a rear portion whereby the front portion is adapted to direct all incoming air flow into the hood scoop and further wherein air released from the rear portion of the air filtration media is allowed to enter the engine of the vehicle.

In an exemplary embodiment, the method further comprises the step of: allowing said air filtration media to slow down air speed through the filtration media to provide a more uniform pressure inside the hood scoop.

In an exemplary embodiment, the method further comprises the step of: allowing for movement of the air filtration media within the hood scoop to maximize air flow into the engine of the vehicle.

In an exemplary embodiment, the apparatus has an extension receptacle wherein the extension receptacle is constructed of a light colored material whereby any displaced byproducts will be observable to a viewer.

In an exemplary embodiment, the apparatus has an extension receptacle wherein the extension receptacle has a wedge extending downwardly away from a bottom portion of the receptacle to be in closer proximity with the air filtration media, whereby if any particle and/or oil is displaced from the air filtration media, it will be attracted and adhered to the wedge of the extension receptacle.

In an exemplary embodiment, the apparatus has a blower means wherein the blower means is any device capable of forcing air through an air filtration media.

To this end, in an exemplary embodiment of the present invention, a system for determining displacement from a filtration media is provided. The system has a container means having an accommodation portion whereby the accommodation portion has an opening thereon for accommodating an air filtration media. Additionally, the system has a blower means for directing air through the air filtration media. Further, the system has an extension portion positioned above the air filtration media.

In an exemplary embodiment, the system has an extension portion wherein the extension portion positioned above the air filtration media extends above the air filtration media and covers the entire width and length of the air filtration media.

In an exemplary embodiment, the system has an extension portion wherein the extension portion positioned above the air filtration media is adapted to accept and display any displaced particulate from the air filtration media.

In an exemplary embodiment, the system has an extension portion wherein the extension portion has a wedge shaped portion extending downward from the bottom of the extension portion to be in close proximity to the air filtration media.

In an exemplary embodiment, the system has an accommodation portion wherein the accommodation portion may be constructed to fit a plurality of different air filtration media.

In an exemplary embodiment, the system has a blower means wherein the blower means is a blower capable of forcing air through the air filtration media at a rate greater than two times the normal operating air flow of the air filtration media's normal vehicle operating air velocity.

To this end, in an exemplary embodiment of the present invention, an apparatus and system for straightening air flow is provided.

In another exemplary embodiment, an apparatus and a system for allowing for better air flow through a hood scoop air filter is provided.

Another exemplary embodiment is an apparatus and system providing superior air flow for vehicles that may be traveling at a higher rate of speed.

Yet another exemplary embodiment of the present invention is to provide an apparatus and a system for smoothing out air flow into a vehicle engine.

Still another exemplary embodiment of the present invention is to provide an apparatus and a system for providing placement for air filtration media into a hood scoop of a vehicle.

An exemplary embodiment of the present invention is to provide an apparatus and a system for providing air filtration media whereby the air filtration media is directly accessible by external vehicle environment.

Yet another exemplary embodiment of the present invention is to provide an apparatus and a system for providing air filtration media placement in a hood scoop of a vehicle whereby the air filtration media may be exposed to the external vehicle environment and not fully contained within the confines of an interior portion of a vehicle.

Another exemplary embodiment of the present invention is to provide an apparatus and a system whereby the apparatus may have an air filtration media fully integrated into the front portion of a hood scoop of a vehicle.

Still another exemplary embodiment of the present invention is to provide an apparatus and a system for filtration and direction of air flow into a vehicle.

Yet another exemplary embodiment of the present invention is to provide an apparatus and a system for filtration and direction of air flow into a vehicle whereby the apparatus and system may be fully contained within a hood scoop of a vehicle.

Still another exemplary embodiment of the present invention is to provide an apparatus and a system for filtration and direction of air flow into a vehicle whereby an air filter may provide more uniform pressure inside a hood scoop.

Another exemplary embodiment of the present invention is to provide an apparatus and a system for filtration and direction of air flow into a vehicle whereby an air filter may provide stabilization and the production of laminar air flow in the hood scoop and elimination of turbulence from inside the hood scoop and consequently the air intake system.

An exemplary embodiment of the present invention is to provide an apparatus and a system for filtration and direction of air flow into a vehicle, whereby an air filter may be positioned within a vehicle hood scoop whereby the filter may block at least a substantial portion of the opening created by the hood scoop between the interior portion of the vehicle and the external environment around the area of the hood scoop.

Still another exemplary embodiment of the present invention is to provide an apparatus and a system for filtration and direction of air flow into a vehicle whereby the filtration media may be positioned just inside the opening of the hood scoop.

Yet another exemplary embodiment of the present invention is to provide an apparatus and a system for filtration and direction of air flow into a vehicle whereby the filtration media may be a standard air filtration media utilized to fit in the opening of the hood scoop.

Still another exemplary embodiment of the present invention is to provide an apparatus and a system for filtration and direction of air flow into a vehicle whereby the filtration media may be positioned substantially vertical in relation to the opening of the hood scoop of the vehicle.

Another exemplary embodiment of the present invention is to provide an apparatus and a system for filtration and direction of air flow into a vehicle whereby the filtration media may block a substantial area of space inside the hood scoop thereby slowing air flow into the engine of a vehicle.

Yet another exemplary embodiment of the present invention is to provide an apparatus and a system for filtration and direction of air flow into a vehicle whereby the air filtration media may filter particulate matter out of incoming air.

Still another exemplary embodiment of the present invention is to provide an apparatus and a system for filtration and direction of air flow into a vehicle wherein the apparatus may be utilized to filter and direct air flow into a vehicle such as a car, motorcycle, ATV, truck, boat, personal watercraft and the like.

Another exemplary embodiment of the present invention is to provide an apparatus and a system for filtration and direction of air flow into a vehicle whereby the air filtration media may smooth out turbulent air entering the hood scoop of said vehicle.

Yet another exemplary embodiment of the present invention is to provide an apparatus and a system for filtration and direction of air flow whereby the air filtration media may be used to both filter out particulate entering the air intake system and may also smooth and stabilize air pressure upon entry of external environmental air into the air intake system of the vehicle.

Still another exemplary embodiment of the present invention is to provide an apparatus and a system for filtration and direction of air flow into a vehicle whereby the air filtration media may cover the entire opening of a vehicle hood scoop.

Still another exemplary embodiment of the present invention is to provide an apparatus and a system for filtration and direction of air flow into a vehicle whereby the apparatus may smooth, and straighten incoming air.

Yet another exemplary embodiment of the present invention is to provide an apparatus and a system for filtration and direction of air flow into a vehicle whereby the apparatus may have an air filtration media whereby the media may be constructed in a honeycomb fashion.

In yet another exemplary embodiment of the present invention is to provide an apparatus and a system for filtration and direction of air flow into a vehicle whereby the apparatus may have an air filtration media whereby the media may be constructed in a suitable fashion necessary for filtration of particulate and for calming turbulent air flow.

Another exemplary embodiment of the present invention is to provide an apparatus and a system for filtration and direction of air flow into a vehicle whereby the apparatus may have a means for measuring and monitoring the velocity of air going through the filter in the hood scoop for monitoring by a user.

Still another exemplary embodiment of the present invention is to provide an apparatus and a system for filtration and direction of air flow into a vehicle whereby the apparatus utilizes a plurality of honeycomb openings on the air filtration media to facilitate straightening of air flow through the filtration media.

Yet another exemplary embodiment of the present invention is to provide an apparatus and a system for filtration and direction of air flow into a vehicle whereby the filtration media may have a plurality of openings thereon, which may slightly slow the air speed while directing it into the channels.

Another exemplary embodiment of the present invention is to provide an apparatus and a system for filtration and direction of air flow into a vehicle whereby the filtration media may have a plurality of openings thereon to smooth out the air field and significantly eliminate turbulence typically found in the hood scoop of a vehicle during air intake.

Various objects, features, aspects and advantages of the present invention will become more apparent from the following detailed description of preferred embodiments of the invention, along with the accompanying drawings in which like numerals represent like components.

Additional features and advantages of the present invention are described herein, and will be apparent from the detailed description of the presently preferred embodiments and from the drawings.

DETAILED DESCRIPTION

Figure 1:
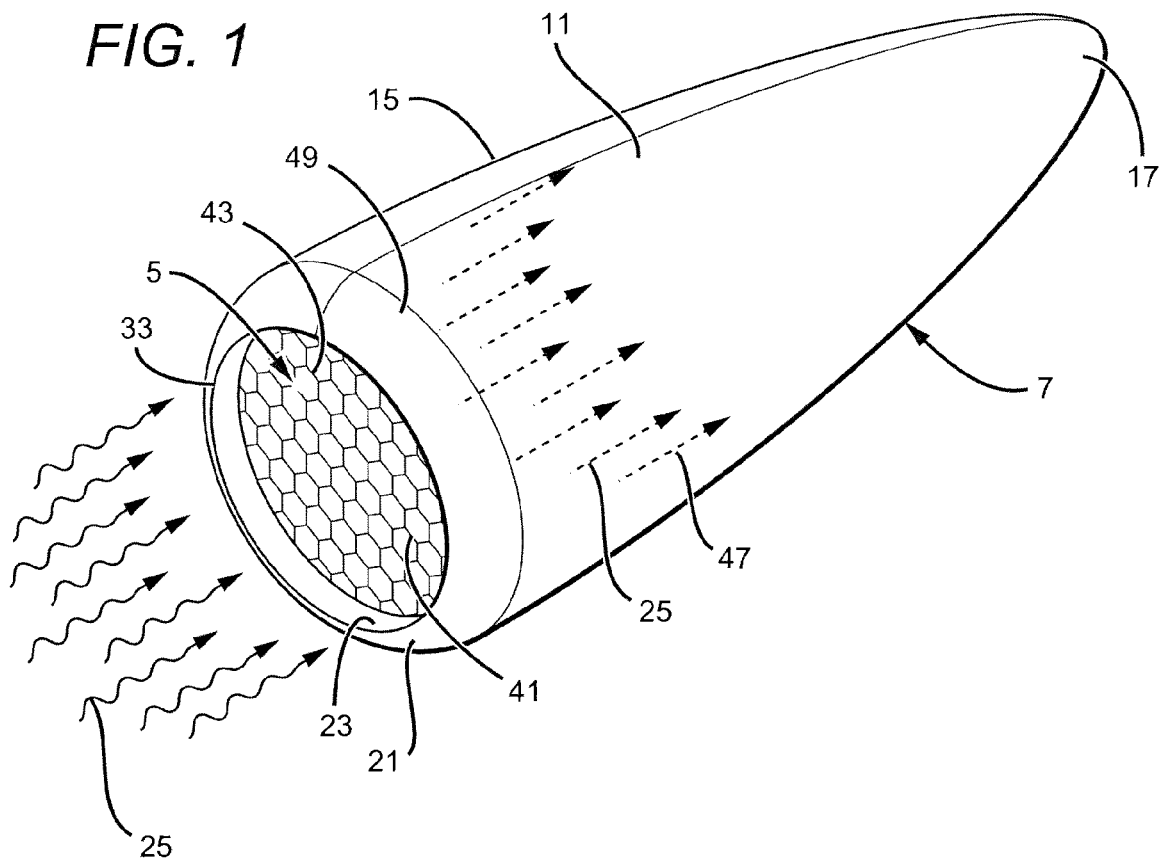
FIG. 1 is a front perspective view of the apparatus in an exemplary embodiment of the present invention.

Turning now to the drawings wherein elements are identified by numbers and like elements are identified by like numbers throughout the 5 figures, the invention is depicted in FIG. 1 and illustrates an apparatus and a system 1 for filtration of air into a vehicle 3 and use of a filtration media 5 for directional enhancement of air flow into the vehicle 3.

Figure 4:
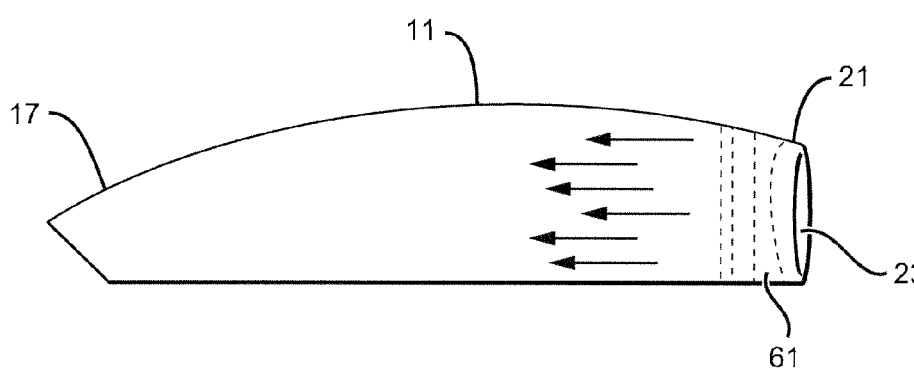
FIG. 4 is a side view of the apparatus in an exemplary embodiment of the present invention.

Referring first to FIG. 1, a new hood scoop 7 and filter element 5 is provided. The hood scoop 7 may be integrated onto the hood 9 of a vehicle 3 as illustrated in FIG. 4. The hood scoop 7 in an exemplary embodiment may take the shape of an oval, but as can be appreciated, the hood scoop 7 may be of any orientation and configuration to allow for the placement of a filter media 5 therein. In an exemplary embodiment, the hood scoop 7 may have a top portion 11 and a first side portion 13 and a second side portion 15. Additionally, the hood scoop 7 may have a rear portion 17 extending away from the front portion 21 of the hood scoop 7. The front portion 21 of the hood scoop 7 may have an opening 23 incorporated therein to allow for air flow 25 through the opening 23 of the hood scoop 7 into an air intake system such as a carburetor 29 contained within the vehicle 3.

Figure 3:
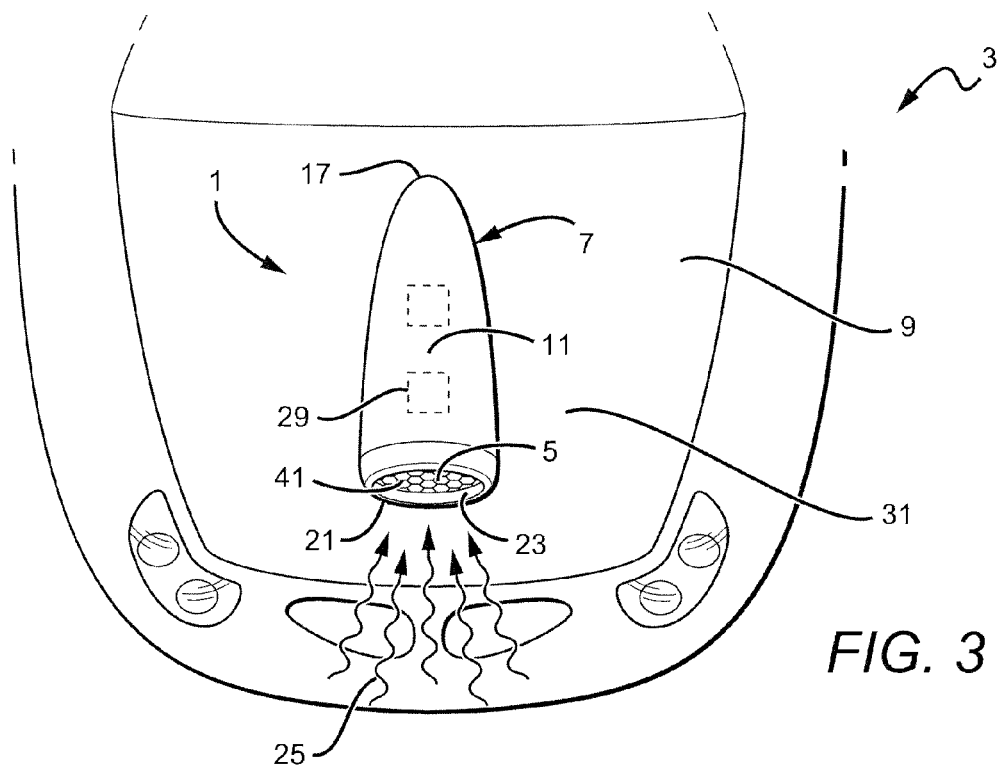
FIG. 3 is a top perspective view of the apparatus in an exemplary embodiment of the present invention.

As further illustrated in FIG. 1 and FIG. 3, the hood scoop 7 may be positioned on the top edge 31 of a vehicle 3 and may be designed with an opening 23 incorporated thereon to allow for air flow 25 to be captured and/or incorporated into the hood scoop 7 and taken into the hood scoop 7 and routed to be used by the vehicle engine (not shown). As illustrated in FIG. 1, the hood scoop 7 may have an opening 23 thereon and further wherein the opening 23 may be substantially filled by an air filtration media 5 incorporated into the opening 23 of the hood scoop 7. It should be noted that the air filtration media 5 may be incorporated into the front opening 23 of the hood scoop 7 such that the air filtration 5 is in a plain with the front edge 33 of the hood scoop 7. However, in another exemplary embodiment, the air filtration media 5 may be inserted into a position just inside the hood scoop opening 23 whereby the air filtration media 5 is maintained in a position inside the hood scoop 7 structure of the vehicle 3. It should also be understood that the air filtration media 5 may be located anywhere within the hood scoop 7 structure.

Figure 5:
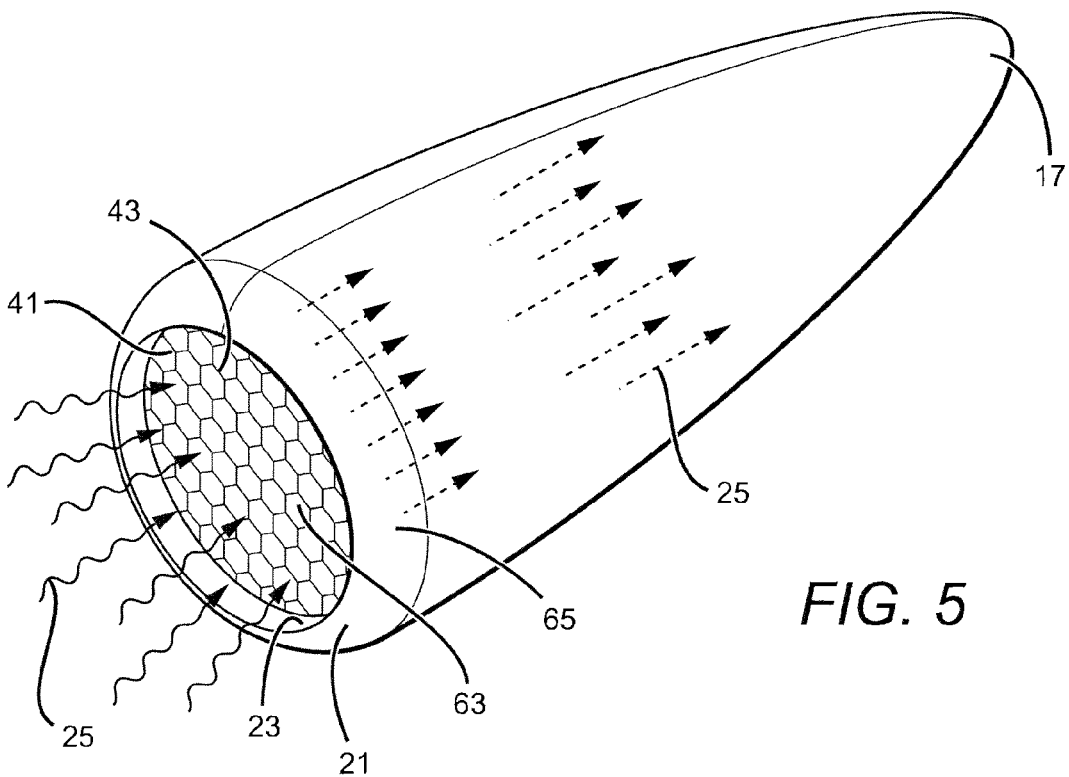
FIG. 5 is another perspective view of the apparatus in an exemplary embodiment of the present invention.

FIG. 1 further illustrates air flow 25 from outside of the hood scoop 7 into the opening 23 positioned in the hood scoop 7. Additionally, as illustrated, the hood scoop 7 may have an air filtration media 5 therein whereby the air flow 25 may have direct contact with the air filtration media 5. The air filtration media 5 may have a honeycomb structural appearance 41. The honeycomb structure may facilitate smoothening and straightening of incoming turbulent air flow 25. Additionally, the air filtration media 5 may be utilized to filter the incoming air flow 25 to eliminate particulates and other foreign substances. Still further, it is contemplated that the air filtration media 5 may also be utilized to smooth air flow 25 through the air filter media 5. Many vehicles which travel at very high speeds have a significant problem wherein the air flow 25 through the hood scoop 7 tends to be very turbulent. It is contemplated that the air filtration media 5 may smooth, straighten and filter the incoming air. In an exemplary embodiment, the air filtration media 5 may have a honeycomb type construction 41. However, it should be appreciated that any type of design pattern and/or configuration may be utilized that will facilitate smoothening, straightening and filtering of the incoming air flow 25. In an exemplary embodiment, the air filter media 5 may have a plurality of honeycomb shaped openings 43 thereon to slightly slow the air speed down while directing the air flow 25 into the appropriate channels. The results of this slowing is a smoother and more uniform air field 47 within the filter as illustrated in FIG. 5. The honeycomb shape of the opening forces air flow 25 into a unidirectional, straightened path upon exiting the rear side 49 of the air filtration media 5.

Additionally, the air filtration media 5 may also provide a more uniform pressure inside the hood scoop 7 of the vehicle 3. In typical prior art applications, a vehicle 3 having a hood scoop 7 is prone to inconsistent and unstable pressure inside the hood scoop 7. This is typically caused by the air flow into a specifically shaped hood scoop 7. This problem tends to increase as both air velocity and the velocity of the vehicle 3 increase. By utilizing the air filtration media 5 within the opening 23 of the hood scoop 7, the air filtration media 5 may provide more uniform pressures inside the hood scoop 7 by eliminating the turbulence inside the hood scoop that is normally found in prior art applications. The positioning of the air filtration media 5 may provide for more consistent and uniform air pressure 47 not only inside the hood scoop 7, but also air flow into the carburetors and other intake mechanisms of the vehicle 3, thereby allowing for better breathing and air flow to the engine (not shown).

Figure 2:
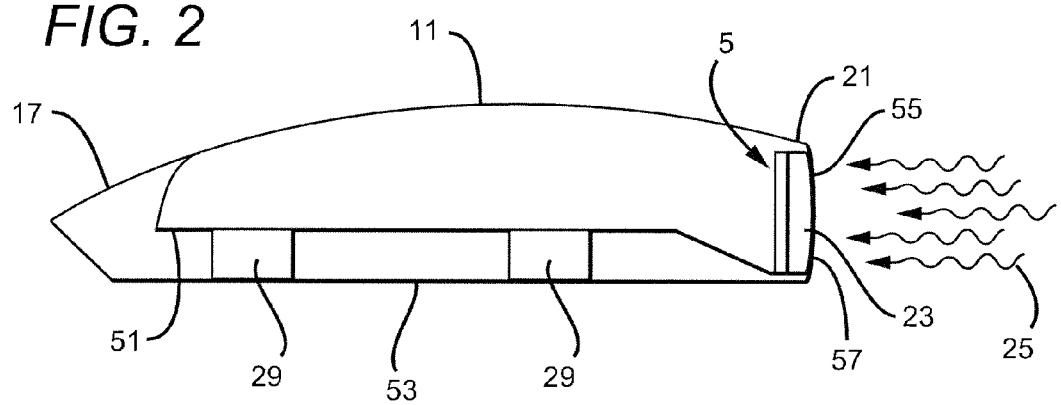
FIG. 2 is a side cross-sectional view of the apparatus in an exemplary embodiment of the present invention.

As illustrated in FIG. 2, a hood scoop 7 may have a generally convex top portion 11 and may taper towards the back portion 17 of the hood scoop 7. Additionally, the hood scoop 7 may also have a hood scoop tray 51 which may seal the bottom portion 53 of the hood scoop 7 to a vehicle carburetor 29. The hood scoop tray 51 may be configured to fit a plurality of different vehicle applications including different intake systems. As illustrated in FIG. 4, the hood scoop tray 51 may be eliminated in systems whereby carburetors 29 are not used. Additionally, as can be seen in FIG. 2, the hood scoop 7 has a front portion 21 whereby an opening 23 is incorporated into the front portion 21 therein producing a lip 55 around the outside edges 57 of the opening. In the cross-sectional view, it can be seen that the air filtration media 5 is located within the hood scoop 7 and is configured to substantially block air flow 25 entering the vehicle intake system without first going through the air filtration media. FIGS. 2 and 4 illustrate placement of the air filtration media 5 in a vertical fashion to completely seal air flow from direct ingress into the vehicle intake system. The vertical placement of the air filtration media 5 allows for more direct contact with incoming air flow 25 whereby all air flow 25 entering the hood scoop 7 would first be confronted with the air filtration media 5 prior to entering the carburetor 29 and/or other intake system of the vehicle 3. Additionally, the placement of the air filtration media 5 at the front portion 21 of the hood scoop 7 ensures that after particulate filtration is achieved, air pressure exiting the air filtration media 5 is more uniform and constant thereby allowing for consistent air flow to the carburetor 29. It is contemplated that the air filtration media 5 be placed just inside the lip 55 of the hood scoop. However, it should be noted, that it is further contemplated that the air filtration media 5 may be placed in a vertical plane with the lip 55 as illustrated in FIG. 3 whereby the opening 23 and filtration media 5 may portray the illusion of a closed off hood scoop 7. Moreover, in another exemplary embodiment, the air filtration media 5 may be placed much further back in the hood scoop 7 if desired by a user.

FIG. 4 further illustrates that another air flow director 61 may be inserted just prior to the air filtration media 5 thereby allowing for smoothing and straightening of turbulent air flow 25 prior to exposure to the air filtration media 5. This may allow for quicker filtration and straightening of the air flow 25 and quicker access to said air flow by the engine of the vehicle 3.

FIG. 5 illustrates the air flow 25 patterns relating to filtration and straightening of the air flow 25 through the filtration media 5. As evidenced by FIG. 5, when air flow 25 collides with the hood scoop opening 23, often times only small portions of the air enters in a substantially straight configuration. A large portion of air flow 25 is very turbulent and directed in less than ideal paths. This can cause serious problems with air intake by the engine of the vehicle 3. As illustrated, the air flow 25 is forced against the air filtration media 5 which utilizes a plurality of honeycomb shaped openings 43 which allow for air flow 25 to be directed therethrough and thereby straightened during the filtration process. The air filtration media 5 may typically have aluminum honeycomb. Additionally, it may also consist of a layer of aluminum powder coated screen. Once the air flow 25 is directed into the front surface 63 of the filtration media, the filtration media will filter the air from particulate and also direct the air into the back portion 17 of the hood scoop 7 in a linear, more uniform fashion than the air that strikes the front surface of the air filtration media 5. Upon exiting the back surface 65 of the filtration media 5, the air flow 25 has been slowed down and straightened out to provide a more uniform and consistent pressure into the intake system of the vehicle 3.

Thus, specific embodiments and applications of a safety device system have been disclosed. It should be apparent however, to those skilled in the art, that many more modifications besides those already described are possible without departing from the inventive concepts herein. The inventive subject matter, therefore, is not to be restricted except in the spirit of the appended claims. The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus for filtering and straightening air flow through a filtration media, the apparatus comprising:
 a hood scoop mounted on a vehicle; and
 a filtration media capable of filtering particulate from entering air wherein said filtration media is mounted into the hood scoop of the vehicle whereby the filtration media is located just inside the hood scoop mounted on the vehicle and further wherein the air filtration media covers the entire width of the opening in a hood scoop mounted on a vehicle.

2. The apparatus of claim 1 wherein the filtration media is a vehicle air filter.

3. The apparatus of claim 1 further comprising:
 an air filtration media wherein the air filtration media has a plurality of honeycomb openings thereon.

4. The apparatus of claim 1 wherein the hood scoop of the vehicle has an opening thereon whereby the opening is utilized to accommodate intake of air into the engine of the vehicle.

5. The apparatus of claim 1 wherein the hood scoop of the vehicle has an opening thereon whereby the opening is utilized to accommodate intake of air into the engine of the vehicle and further wherein the filtration media is located in the opening of the hood scoop.

6. The apparatus of claim 5 wherein the filtration media is located just inside the opening of the hood scoop.

7. The apparatus of claim 1 wherein the filtration media is mounted in a vertical plane to the outside opening of the hood scoop whereby air entering the hood scoop would defaultly encounter the filtration media before it could further enter the engine of a vehicle and further wherein the filtration media is in direct contact with air flow outside a vehicle.

8. A system for filtration and straightening of air flow into a vehicle engine, the system comprising:
 a hood scoop mounted onto a vehicle;
 an air filtration media having a front portion and a rear portion whereby the air filtration media is adapted to be releasably attached to the hood scoop mounted onto a vehicle wherein the air filtration media has a plurality of honeycomb openings thereon; and
 filtration media is mounted in a vertical plane to the outside opening of the hood scoop whereby air entering the hood scoop would defaultly encounter the filtration media before it could further enter the engine of a vehicle.

9. The system of claim 8 wherein the air filtration media is capable of smoothing and straightening incoming air.

10. The system of claim 8 wherein the air flow entering the air filtration media may be turbulent and further wherein the air filtration is capable of providing uniform air pressure exiting from the rear portion of the media.

11. The system of claim 8 wherein the air filtration media may have at least one side wherein the at least one side is adaptable for fitment against the inside edge of the hood scoop.

12. The system of claim 8 wherein the air filtration media utilizes a plurality of honeycomb openings thereon to stabilize incoming turbulent air directed at the front portion of the air filtration media.

13. The system of claim 8 wherein the air filtration media is substantially fully exposed to air flow entirely outside of the vehicle.

14. The system of claim 8 wherein the air filtration media covers the entire width of the opening in a hood scoop mounted on a vehicle.

15. The system of claim 8 wherein the hood scoop is attached to the front portion of the vehicle in a position above the hood of the vehicle.

16. A method for utilizing a filtration and laminar air flow system, the method comprising the steps of:
 providing a vehicle hood scoop mounted to a portion of the vehicle whereby the hood scoop has an opening thereon to accommodate air flow from outside the vehicle and to direct said air flow to the engine of the vehicle; and
 providing an air filtration media whereby the air filtration media is utilized to filter particulate and to stabilize air pressure entering the vehicle whereby the filtration media is located just inside the hood scoop mounted on the vehicle and further wherein the air filtration media covers the entire width of the opening in a hood scoop mounted on a vehicle.

17. The method of claim 16 further comprising the step of: utilizing a plurality of honeycomb shaped openings on the air filtration media to allow for laminar air flow of incoming air, whereby the shape of the openings allows for smoothing and straightening of incoming air into the back portion of the hood scoop and further into the engine of the vehicle.

18. The method of claim 16 further comprising the step of: providing an air filtration media having a front portion and a rear portion whereby the front portion is adapted to direct at all incoming air flow into the hood scoop and further wherein the air released from the rear portion of the air filtration media is allowed to enter the engine of the vehicle.

19. The method of claim 16 further comprising the step of: allowing said air filtration media to slow down air speed through the filtration media to provide a more uniform pressure inside the hood scoop.

20. The method of claim 16 further comprising the step of: allowing for movement of the air filtration media within the hood scoop to maximize air flow into the engine of the vehicle.

* * * * *